Jan. 11, 1966 R. H. PETERSON 3,229,019

ELECTRONIC MUSICAL INSTRUMENT

Filed Jan. 4, 1960 3 Sheets-Sheet 1

INVENTOR.
Richard H. Peterson
BY
Donald H. Sweet
Atty.

Jan. 11, 1966 R. H. PETERSON 3,229,019

ELECTRONIC MUSICAL INSTRUMENT

Filed Jan. 4, 1960 3 Sheets-Sheet 2

INVENTOR.
Richard H. Peterson
BY
Donald H. Sweet
Atty.

INVENTOR.
Richard H. Peterson
BY
Donald H Sweet
Atty.

United States Patent Office 3,229,019

Patented Jan. 11, 1966

3,229,019

ELECTRONIC MUSICAL INSTRUMENT

Richard H. Peterson, 10108 Hapnew Road E., Oak Lawn, Ill.

Filed Jan. 4, 1960, Ser. No. 116
5 Claims. (Cl. 84—1.01)

This invention relates to electronic musical instruments of the organ type. More particularly, it relates to improvements in the ensemble or chorus effects obtainable with such instruments.

Organ-like instruments producing tones by means of electronic oscillators, rotating electromagnetic tone wheels, or the like, are very well known in the art. Dozens of different circuits are known for producing tone frequency currents that are switched on and off, or that are switched into amplifying circuits by means of organ playing keys, and are then converted into sound by means of one or more loudspeakers. Most electronic organs employ means for creating a variety of tone timbres by means of combining various combinations of harmonically related oscillations, or by means of passing tone signals that are naturally rich in harmonics through so-called formant filter circuits that alter the intensity relationships between the various harmonics. Typical examples of electronic organs utilizing these principles are shown in U.S. patents to Laurens Hammond, 1,956,350, and Winston Kock, 2,233,948. Still other methods of obtaining a variety of tone timbres are shown in Heytow and Peterson 2,649,006.

While all of these methods are more or less successful in creating a variety of different tonal effects, they all have the limitation that when combinations of stops are sounded, certain elements are missing, these elements being the means whereby the listener is made aware of the so-called chorus, or ensemble effect that is present when a plurality of acoustic musical instruments are sounded simultaneously.

The effect of fullness, or bigness, that one experiences with listening to a chorus of acoustic instruments, such as the instruments of an orchestra or a combination of organ pipes is apparently due to many factors. Loudness is perhaps the least important of these factors. The electronic organs can be amplified to almost any degree and doing so renders it quickly apparent that merely making the organ loud does not create the same "big" or "full" ensemble or sound present in an acoustic pipe organ.

One of the important factors is unquestionably the fact that each individual instrument, or each individual organ pipe, is an independently tunable sound source and the combination of many sound sources that are not in theoretically perfect tune with one another results in the rising and falling intensity of various frequency regions as the frequencies combine in different phase relationships at times being additive and at other times being more or less substractive.

The so-called "beating" that occurs in an electronic system is somewhat different than the beating of acoustic instruments as is more fully discussed in Leslie, 2,596,258. This patent suggests one solution for this phase of the problem and we have found that the multiple channel system proposed by Leslie is highly desirable. Although the objectionable characteristics of electronic beating can be avoided by following the teachings of Leslie, it is nevertheless true that a limited number of electronic oscillators such as are employed in ordinary electronic organs are not capable of producing the very complex beat characteristics that are partially responsible for the apperception of bigness or chorus.

Another factor that is present in acoustic instruments is the factor of spatial distribution. In the case of acoustic instruments, or organ pipes, every tone source is located at a different point in space, each point being separated from the others by a distance that is at least one or more wave lengths away from some of the other sources. Since we listen to the sound with two ears, and since this binaural hearing results in a remarkable ability to sense direction, the sensation of bigness is greatly enhanced when our ears tell us that the sound comes from many sources.

Still other factors are present to transmit to the brain information of a type that causes us to be aware that the total sound is the result of a multiplicity of tone sources. Each sound source of the acoustic variety generally has a distinctive and characteristic attack and decay. Some instruments, for example, speak more slowly than others. Certain instruments such as the trumpet are frequently associated with a somewhat percussion-like attack where the initiation of the tone is very prompt and where, during the first instant, the tone reaches a slightly higher intensity level than the more or less steady state tone that follows. Certain stringed instruments are frequently associated with a rather slow "singing" type of buildup.

Further, tremolo or vibrato effects are frequently applied to the various instruments and these tremulant or vibrato effects take a variety of forms. A violin, for example, can produce a definite vibrato sound when the violinist rocks his finger on the string. This effect is almost completely frequency modulation, since the intensity is hardly affected at all. On the other hand, wind instruments, and organ pipes in particular, are generally subject to tremulant effects that are a combination of amplitude and frequency modulation. The degree of the frequency modulation and/or the amplitude modulation is highly variable for different instruments and for different organ pipes in the same organ. Also a chorus of many instruments is characterized by a very complex situation wherein each of the many different tone sources has a substantially different form of tremulant than the other sources, and wherein with respect to time, certain of the tones are going sharp while others are going flat, and some tones are getting loud while others are getting soft.

It is apparent, then, that the chorus effects of these combinations of acoustic instruments are quite different than the effect of playing an electronic organ where all of the notes and all of the stops of the entire organ are subject to relatively identical attack and decay characteristics and virtually identical vibrato or tremulant characteristics and where all of the tone comes from a common loudspeaker.

With the above in mind, it is the object of this invention to provide an improved electronic musical instrument provided with improved combined tremulant means whereby the subjective effect of a true ensemble is created. A further object of the invention is to provide an improved electromechanical tremulant apparatus, whereby the advantages of such electromechanical or "acoustic" tremulants can be realized with apparatus of smaller size than has been heretofore possible.

In this disclosure and in the appended claims frequent mention will be made to the terms "vibrato," "tremolo," and "tremulant," and these terms are rather loosely and irregularly used. In the following description, vibrato is the name of variation in pitch only; tremolo is the name of a variation in volume only; and tremulant is a generic term including vibrato and tremolo and various combinations in which the pitch and loudness both vary. In all instances, the frequency of the variations is between about five and about eight cycles per second, with the preferred optimum at about seven. Tremulant also includes any other signal variation at the subsonic tremulant frequency, such as changes in timbre.

For reasons that are not clearly understood, but that can be readily demonstrated, listeners generally agree that the application of a vibrato or a tremolo or a combined tremulant generally creates a desirable effect on most types of organ music. This is true of electronic organs, as well as of pipe organs, although, for reasons already discussed, the effect generally produced by the electronic instrument is not nearly as satisfactory as that produced by the pipe organ.

I have found that by applying a particular type of tremulant system to an electronic organ, it is possible to create a much more desirable tremulant effect and at the same time to create a substantially improved chorus or ensemble characteristic, compared with that ordinarily associated with the electronic organ.

As has been previously explained, part of the chorus effect of the pipe organ is due to the dispersal of the tone-producing sources in space. It is relatively common practice to employ a plurality of loudspeakers in connection with an electronic organ and frequently these loudspeakers are placed in separate cabinets that are located at different points of the room in which the organ is heard. This dispersion of sound that is thus created is somewhat useful, but I have found that the effect of this treatment is not anywhere near as desirable as might at first be expected. This is because, since identical sounds are radiated from each of the sources, the listener tends to more or less combine the two sources in his brain and the apperceptive result is as if the listener were hearing only one phantom third source located somewhere between the two or more actual sources. Or if the listener is a little closer to one of the sources than to the others, it has been found that turning the other sources of sound on or off has little effect on the listener since his sensory attention is primarily focussed on the closer sound source.

In the present invention, however, a multiple sound source system is provided in which there are material differences in the character of tone produced by each of the sources so that the ear is aware of each of the sources as a separate entity and therefore as a recognizable part of a combined chorus. I have found that an organ employing amplitude modulation only, generally has an unnatural sound lacking in warmth and frequently having a rather unpleasant throbbing effect. Therefore, at least some frequency modulation is highly desirable in order to produce a highly musical result. This frequency modulation may be supplied by either electrical or acoustic means. As an example of an acoustic tremulant, which includes a high degree of frequency modulation, reference is made to the patent to Leslie, U.S. Patent No. Re. 23,324. This type of a tremulant effect is highly desirable when applied to certain of the organ voices but can be almost equally undesirable when applied to other organ voices. This is because tones that are relatively pure and devoid of upper order harmonic development will sound well with a high degree of frequency modulation, while tones that are rich in harmonic development, such as string and reed tones, do not sound well with such large percentages of frequency modulation.

Figure 1:
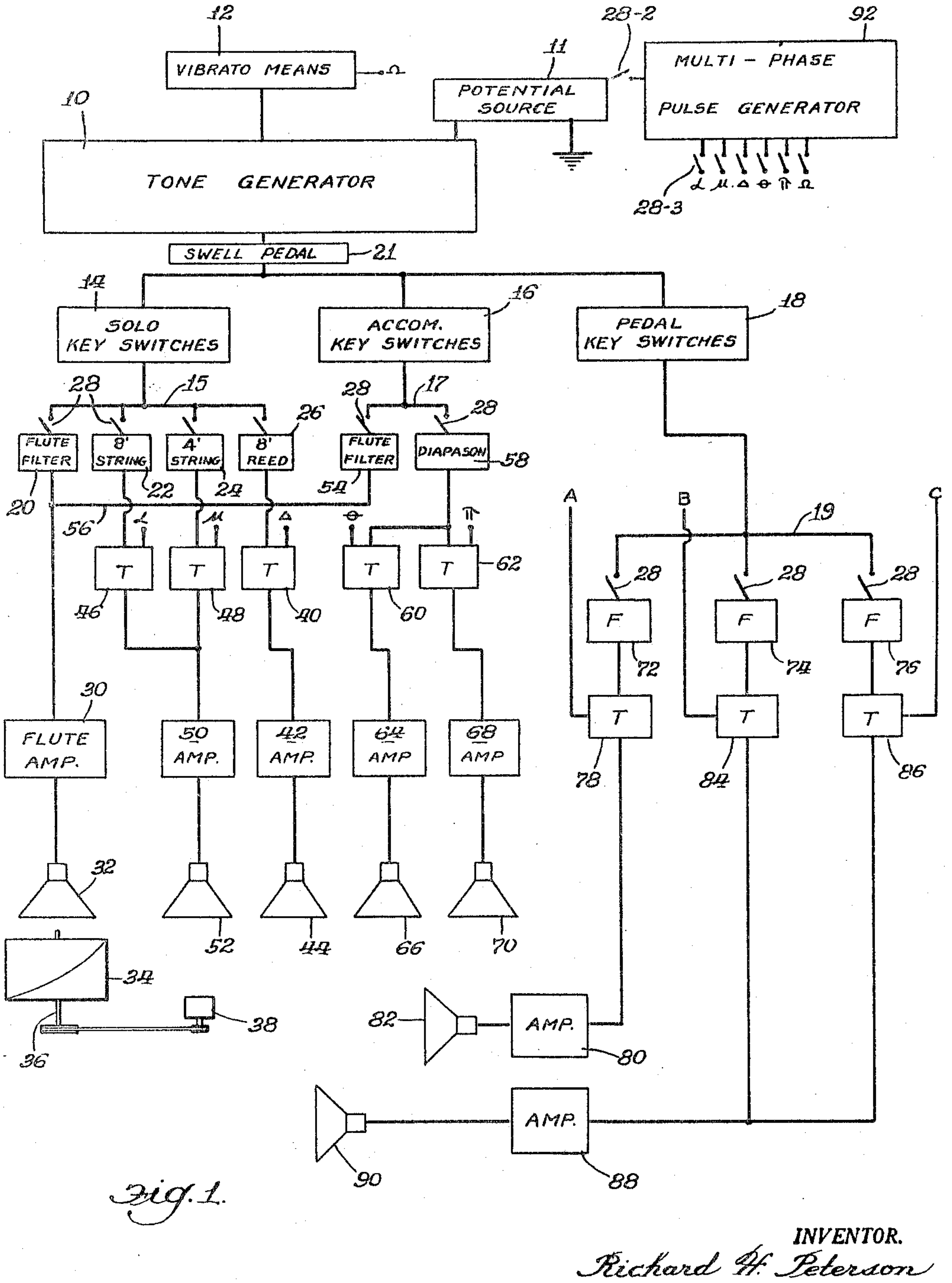
FIGURE 1 is a block diagram showing an organ including various features of the invention.

In the embodiment selected to illustrate the invention, the tone generator 10 may be any source of electronic oscillations having the desired predetermined frequencies, such as are disclosed in Kock, 2,233,948, or Heytow and Peterson, 2,649,006. Another type of generator particularly suitable for combining with the features of the invention is that disclosed in my Patent #3,143,712 issued August 4, 1964.

The tremulant means 12 is a vibrato means connected to affect the frequency of all tones coming from the generator. Suitable vibrato means are disclosed in Patent 2,649,006, and many alternatives will be obvious to those skilled in the art.

In the conventional organ, there is one manual of keys for the solo switches 14, and a second manual for the accompaniment key switches 16, usually placed lower down and closer to the player. There is also a set of pedals for operating the pedal key switches 18. All three sets of switches are indicated as operatively associated with the tone generator. It will be understood that the connections involved are in multiple.

The assembled signal delivered by each of these sets of key switches passes to a distributing bus. I have indicated a bus 15 for the solo clavier 14; a bus 17 for the accompaniment clavier 16 and a bus 19 for the clavier 18. From the distributing bus the signal passes to a selected one of a plurality of channels, each channel being selectively controlled by a conventional stop tablet switch 28 on the console adjacent the manuals. I have illustrated only four channels for the solo key switches 14, two for the key switches 16, and three for the pedal switches 18. It will be obvious that in many complete organs there will be a much larger number of channels for each of the groups of switches. For the solo switches I have indicated a flute channel 20, an eight foot string channel 22, a four foot string channel 24, and an eight foot reed channel 26. The stop switches 28 are identical for all the coupling circuits for all the manuals, and are conveniently positioned close beside the manuals they control, except for the pedal switches, which obviously need a small panel of their own available to the hand of the player, rather than the foot.

From the flute channel 20, signal passes to the flute amplifier 30, and from the amplifier 30 to the flute speaker 32. Unless the tone generator 10 itself is delivering signal with a vibrato impressed on it, the tone from speaker 32 will be of constant pitch and of constant volume, subject to the conventional volume control of the conventional pedal 21 of the organ.

The acoustical signal from speaker 32 passes through a rotary sound channel 34, turned on its axle 36 by a motor 38 at vibrato frequency. As described in detail in Leslie Reissue Patent 23,323, the signal coming from the rotary channel 34 has a tremulant in which frequency modulation is more conspicuous than amplitude modulation but both are present. When the acoustic tremulant is not desired, the player turns off the motor 38.

From the reed channel 26, signal passes to the tremulant 40, which is illustrated in greater detail in FIG- URE 2, and which imposes a tremulant that includes modulations in volume and in timbre. This signal is amplified in the amplifier 42 and delivered directly to the speaker 44. The signal from the eight foot string channel circuit 22 is passed through tremulant 46 and the signal from the four foot string channel 24 passes through a tremulant 48. Since these two oscillations are octavely related and of similar timbre, I prefer to put them both through a single amplifier 50 and the combined product issues from the speaker 52.

Signal from the accompaniment key switches may pass through a flute channel 54 and because this pure tone is effectively handled by the acoustic tremulant 34, I may carry this signal through a conductor 56 over to join the signal from the channel 20 and issue through the same acoustical channel.

Signal may also pass through the diapason coupling circuit 58. I have illustrated two different tremulants 60 and 62, each independently controlled by the player to be operative or inoperative. The tremulant 60 delivers signal to an amplifier 64 and speaker 66 and the tremulant 62 delivers to an amplifier 68, and a speaker 70. The parallel paths thus provided from the diapason coupling circuit to the final speakers 66 and 70 may be identical, except that one of them has its tremulant phase or frequency identified by the Greek leter theta, and the other has its phase or frequency identified by the Greek letter pi.

When the two tremulants have constant relative phase relation, but a definite phase difference, the speakers 66 and 70 can be placed in geometrically remote positions and the ear of the hearer will tell him that he is listening to a plurality of different sources located in different positions. A similar but slightly different effect can be secured by having theta and pi, of almost but not quite identical subsonic frequency. For instance, if theta is 6.9 vibrations per second and pi is 7.1, there will be a continuous shifting of the phase difference, as well as the fixed geometrical separation.

A slightly different method of simulating an ensemble effect is shown in connection with the pedal tone amplification system. The pedal key switches 18 deliver signal to any selected one or more of three different channels, selected by closing stop switches 28, and including a diapason filter 72, a string filter 74, and a reed filter 76. Signal from the filter 72 goes through a modulator 78 and pedal amplifier 80 to a loud speaker 82. Signal from filter 74 goes through modulator 84 and signal from filter 76 goes through modulator 86. These two modulated signals are then united electrically in a single channel and controlled by pedal amplifier 88, and delivered to a separate loud speaker 90. Amplifiers 80 and 88 may be activated in unison but electrically they are separate.

The modulators 78, 84 and 86 do not operate at standard tremulant frequency of five to eight cycles per second. They do however, introduce a variation in loudness by means of circuits according to FIGURE 2, and identical with a tremulant, except that the period is from 4 to 10 seconds per cycle, or from 20 to 60 times as long. This is longer than any one note is ordinarily played, and the effect is not perceived as a tremulant, but rather the slow undulation that results is substantially similar to the very slow phase shifts and the resulting gradual change in the timbre of the sound that is heard when combinations of pipes are played that are not perfectly in tune with one another. This further enhances the illusion of ensemble and bigness.

*Tremulant pulses*

Figure 3:
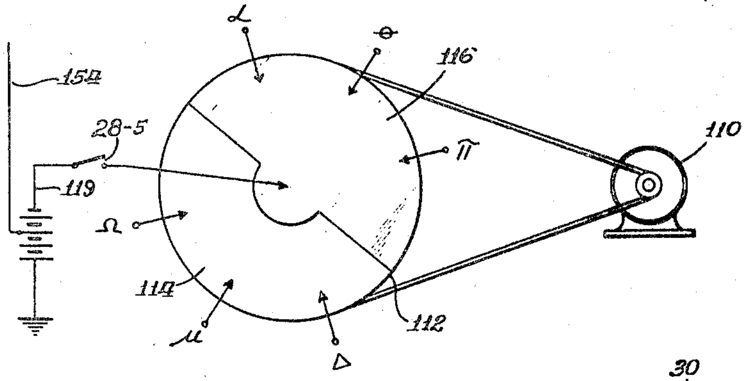
FIGURE 3 is a schematic diagram showing a means of obtaining a plurality of electrical pulses having a plurality of phase relationships.

The pulse generator 92, is indicated functionally in the block diagram of FIGURE 1, and one specific embodiment is illustrated in greater detail in FIGURE 3. A player-controlled stop switch 28–2 connects it to the potential source 11 to render it operative, and each of the six individual D.C. tremulant pulses has its stop tablet switch 28–3.

It will be obvious that when there are a plurality of different signals, each of which has a tremulant characteristic which may be independent of, and different from the characteristics of all the other signals, these differences could be limited to phase differences only. However, they can also include slight differences in the vibrato frequency employed, but only over a relatively narrow range. When there is a difference in frequency the phase relationship can no longer remain constant but must shift progressively into and out of phase.

Figure 2:
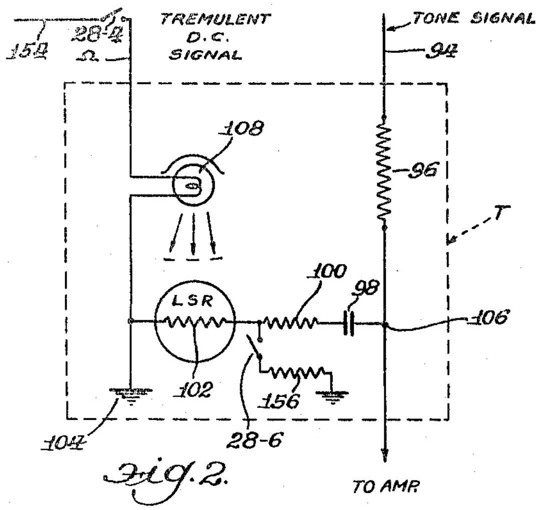
FIGURE 2 is a schematic diagram of one type of pulse responsive amplitude and timbre modulator that can be used in an organ according to the invention.

FIGURE 2 is a schematic diagram of one suitable means for imparting an amplitude tremulant to an unmodulated signal appearing on conductor 94. Resistor 96, capacitor 98, resistor 100, and the light-sensitive resistor 102, function as a potentiometer. The tremulant pulse, which happens to be indicated as omega, activates a light source 108, and when the light source illuminates the light-sensitive resistor 102, that resistance may be reduced in any desired ratio, up to ratios as high as one million to one. At all times the amplitude of the signal at point 106 will be that fraction of the amplitude at 94 represented by the ratio between the resistance from point 106 to ground at 104, and the resistance between source 94 and ground at 104.

At very low frequencies the amount of variation in volume for a desirable tremolo is much less than at higher frequencies. This variation is automatically secured by means of the capacitor 98, which may easily be made of such capacity that it has a relatively high impedance for signals of low frequency and relatively low impedance for signals of high frequency. As the frequency increases the effectiveness of the circuit for making a signal at 106 a reduced fraction of that at 94 is increased. Similarly, at the highest frequencies for which such effects are employed, a capacitor 98 of the right size to secure a desirable graduation throughout nearly all the range, becomes almost an open circuit. Almost complete interruption of the signal at 96 tends to produce a stutter rather than a tremulant. To avoid that effect, the resistance 100 is placed in series with the capacitor 98 so that at very high frequencies the maximum volume fluctuation is suitably adjusted. It is to be noted that this frequency selective amplitude tremulant produces an effective timbre tremulant when the signal modulated is a complex wave form. This duplicates the effect of the pipe organ tremulant, since it is a characteristic of all organ pipes that they become "brighter" as their loudness is increased by increasing the wind pressure. Tremulant channels according to FIGURE 2 are suitable for all the channels identified by the letter T in FIGURE 1.

Figure 4:
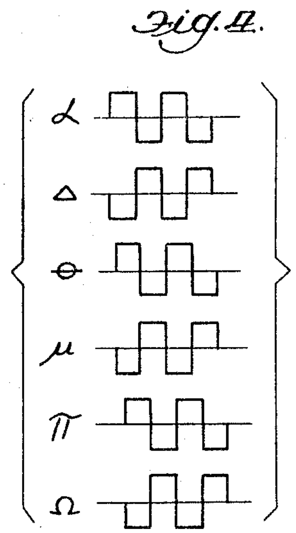
FIGURE 4 is a series of graphs of amplitude as a function of time, showing the kind of phase relationships obtainable with the device of FIGURE 3.

The multiphase pulse generator of the FIGURE 3 is adapted to generate pulses having predetermined desired phase relationships but all of identical frequencies. The motor 110 rotates a disc 112 at the vibrato frequency. The face of the disc includes a nonconducting half 114, and an opposite half 116 faced with conducting metal, such as copper, and a potential source 119 keeps the copper at the correct potential. Each of the six phase terminals identified in FIGURE 1 on the generator block 92 has a contact brush and these contact brushes can be spaced in any predetermined uniform or irregular spacing, so that during half of each rotation the brush will ride on the copper 116 and during the remainder of the rotation it rides on the nonconductive portion 114. This will illuminate and extinguish a light source 108 according to FIGURE 2, and all the similar light sources, always with the same identical frequency, but with any one of a plurality of different phase relationships. The time-potential curve of the D.C. current is indicated in FIGURE 4 for each of the six contacts above. It will be noticed that alpha and delta are 180° apart; theta and mu are 180° apart and, with the disc 112 rotating counterclockwise, approximately 60° behind alpha and delta; and pi and omega are 180° apart and 60° behind theta and mu.

Figure 6:
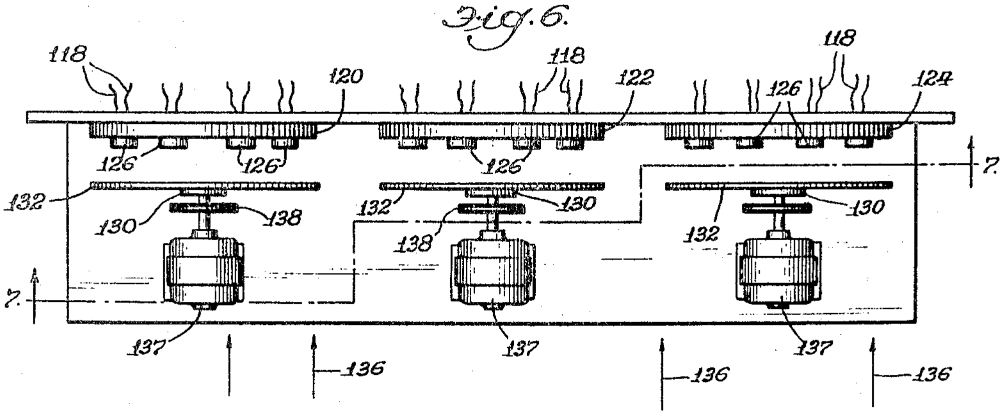
FIGURE 6 is a plan view of a modified pulse generator in which frequency differences as well as phase differences can be obtained between different tremulants.
Figure 7:
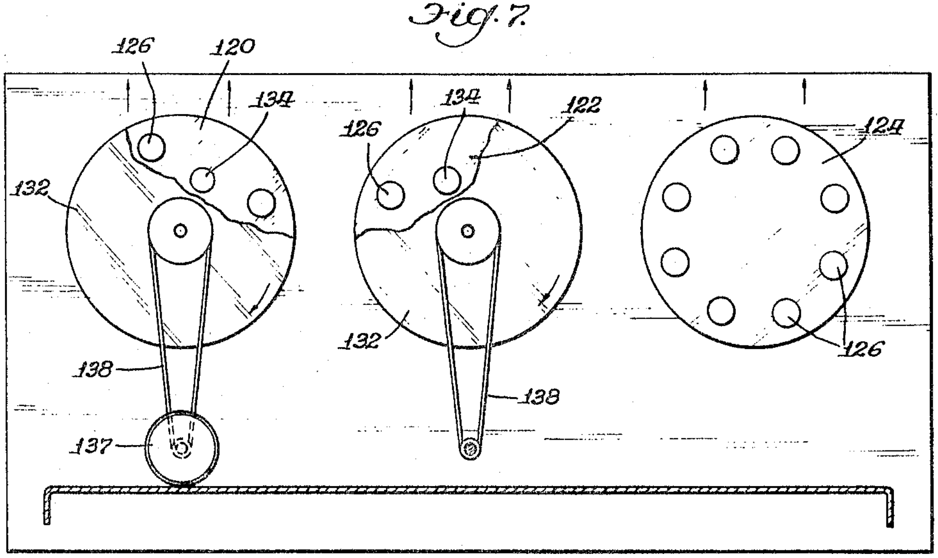
FIGURE 7 is a sectional view taken on line 7—7 of FIGURE 6 with some parts cut away.

In FIGURES 6 and 7 I have indicated a construction in which the phase relationship of the different tremulants is continuously shifting because the frequencies of the different tremulants differ slightly. Each of the three fixed discs 120, 122, and 124 carries a multiplicity of light-sensitive resistors 126 spaced around the periphery of the disc and provided with takeoff leads 118. In front of each stationary disc is a rotating hub 130 carrying a disc 132, of variable opacity.

At any given radius corresponding to the positions of the light-sensitive resistors 126, the disc may have a cyclic variation in opacity of any predetermined shape and the precise modulation of the tremulant will correspond. Additional variety of an advantageous nature may be obtained by positioning one or more target resistors 134 at a different radius from most of the target resistors and having a corresponding annular band on the rotating disc carry a tremulant of different shape. All the discs intercept a flood of substantially collimated light coming toward the device in the direction of the arrows 136.

Each disc 132 is driven at approximately vibrato frequency by a motor 137 provided with a drive belt 138. It will be obvious that by adjusting the speeds of the three motors so that they differ by anything from 2 to 6 percent, a continual phase shift is secured between the potential diagrams according to FIGURE 4.

Figure 5:
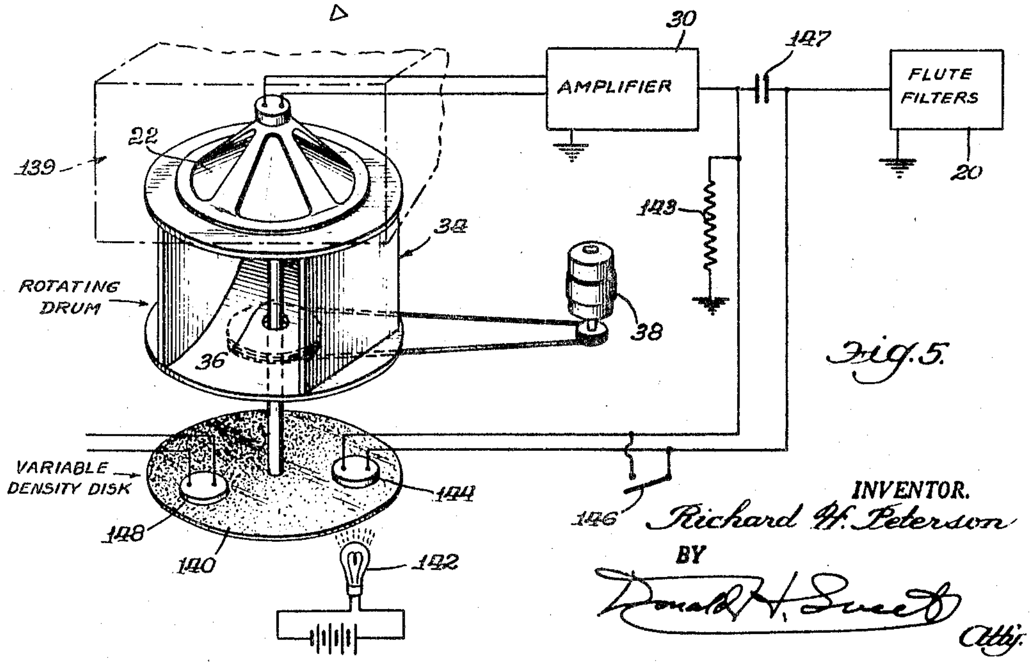
FIGURE 5 is a schematic and perspective diagram of an acoustic tremulant device associated with means for providing an electronic tremulant effect on the signals in addition to the effect produced by the acoustic tremulant device.

Referring now to FIGURE 5, I have illustrated the rotating sound channel 34 driven by the motor 38, and the stationary cone speaker 32 above it, with a suitable resonant enclosure 139 indicated in dotted lines for the speaker. The shaft 36 has been extended farther down and carries a disc 140 of variable opacity, and a constant source of light is indicated at 142. At 144 I have positioned a light sensitive resistor connected in series between the flute channel 20 and the flute amplifier 30.

It will be obvious that the disc 140 would be available to take care of a number of additional tremulants. I have indicated a second light-sensitive resistor, which would be available for other tremulants or as an alternative to substitute for the light-sensitive resistor 144. One of them can be positioned to give a tremolo in unison with the vibrato produced by the rotating sound channel, and the other could produce a tremolo offset into a different phase.

From the filter 20, when switch 146 is closed, the signal passes directly to the amplifier 30, and if it is not carrying any vibrato from the generator 10, the only tremulant in the delivered sound will be that developed by the rotating sound channel 34. The Doppler effect produced by the rotating sound channel 34 is, at middle and high frequencies, substantially proportional to the diameter of the path of the sound outlet. At low frequencies however, the sound channel is not effective to produce a tremulant of desired magnitude, because the wave length of the sound is long compared to the dimensions of the sound channel.

Where it is impractical to have the path of large diameter, the light-sensitive resistor 144 extends the tremulant down into frequencies lower than the channel 34 can deal with, and the two effects can be combined to secure a uniform and pleasing tremulant down to the lowest frequencies for which a tremulant is esthetically desirable.

However, when the parts are proportioned to secure this desirable result down to the lower end of the tremulant range, if the resistor 144 is also fully effective at all frequencies, the upper end of the range gets too much tremolo. To avoid this effect, I provide a capacitor 147 in shunt with the resistor 144. It is not at all difficult to proportion capacitor 147 so that its low impedance at high frequencies prevents the resistor 144 from affecting the high frequencies materially, but the low frequencies can not get through the capacitor and remain modulated by the resistor. Thus, an accurately predetermined degree of tremulant is secured throughout the entire range where tremulant is desired at all.

It is well known that the change from tremulant to steady tone should not be accompanied by any material change in overall or average loudness. With attenuators according to FIGURE 2, there are several ways to provide for this. I have indicated a conductor 154 receiving an intermediate voltage from source 119. A stop switch 28–4 (see FIGURE 2) may be closed when stop switch 28–2 and stop switch 28–5 in FIGURE 3 are opened, and vice-versa. The intermediate light value secured with stop switch 28–4 is replaced by the high and low values of FIGURE 4 and the mean value remains unchanged. An equivalent electrical expedient is the resistor 156, controlled by stop switch 28–6. When the light 108 is extinguished, and the resistor 102 is of maximum impedance, closure of switch 28–6 reduces the impedance between ground and the take off point 106 to a mean value. It is noted that stop switch 28–2 is a single pole switch, but switches 28–4, 28–5 and 28–6 must be in multiple, with a separate contact for each note.

Many delightful and distinctive tremulant effects can be secured by connecting the parts illustrated in FIGURE 3 so that one loud speaker delivers a tone of one timbre and a different loud speaker delivers a tone of a different timbre, and they each have the same tremulant frequency, with the maximum loudness of one corresponding to the minimum loudness of the other.

Figure 8:
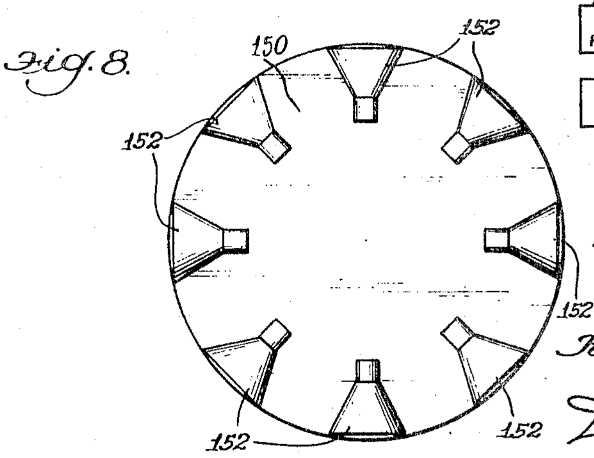
FIGURE 8 is a plan view of a modification in which the sound source is shifted cyclically from place to place without mechanical displacement.

Referring now to FIGURE 8, I have indicated a support 150, which is illustrated as circular, carrying a multiplicity of individual loud speakers 152. It will be obvious that with the speakers 152 connected in homologous series arrangement with the light-sensitive resistors 126, and the opacity pattern a single sine curve variation, or equivalent, there will be a zone of relatively complete silence at one side of the support 150, and a zone of maximum loudness diametrically opposite, and these zones will run around the edge of the stationary support 150 to produce an effect analogous to that which would result from rotating the support. This avoids certain mechanical difficulties when it is desirable to increase the Doppler effect materially beyond what can be obtained with a rotating device of relatively small radius such as that illustrated in FIGURE 5.

Figure 9:
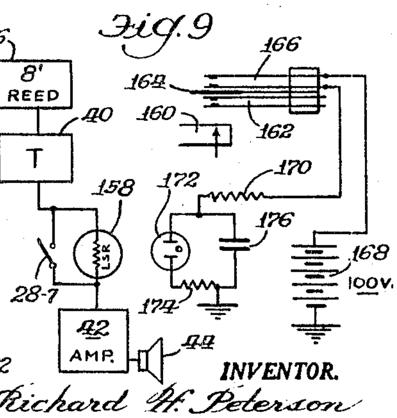
FIGURE 9 is a schematic and block diagram of a circuit for automatic delay of attack.

A most attractive illusion of multiple sources may be produced by putting a player-controlled attack delay into some of the channels. In FIGURE 9, I have indicated a delay circuit interpolated between the reed filter 26 and its amplifier 42. With the stop switch 28–7 closed the the conditions in FIGURE 1 obtain. When the stop switch 28–7 is open, amplifier 42 must receive its signal through light-sensitive resistor 158. The playing key 160 closes a key switch 162 for the delivery of signal to all the filters. Above the switch 162 is an insulator 164, and above the insulator is the additional switch 166. This switch closes a circuit from a potential source 168 through a resistor 170 and a neon tube 172 and resistor 174 to ground. A capacitor 176 is shunted across the neon tube 172, and resistor 174.

With stop switch 28–7 open, all the filters receive signal through key switch 162. Key switch 166 delivers D.C. switch will charge capacitor 176 to the potential necessary to break down the neon tube 172, and the light from the neon tube will reduce the impedance of resistor 158. It is now possible for amplifier 42 to function and speaker 44 will speak later than other connected speakers such as the flute speaker 32 and the string speaker 52. The time interval should be sufficient to enable the hearer to perceive two different beginnings. With oscillators having a fairly sharp attack, a delay of the order of magnitude of one-twentieth of a second or so, produces the desired result.

Others may readily adapt the invention for use under various conditions of service by employing one or more of the novel features disclosed, or equivalent thereof.

Sub-tremulant frequency modulators, such as 78, 84 and 86 are acceptable and effective for the higher notes also, but somewhat less needed for notes which can take a normal tremulant.

As at present advised with respect to the apparent scope of my invention, I desire to claim the following subject matter:

1. Electronic musical equipment comprising, in combination: a source of musical signal having three characteristics, one called frequency, another called amplitude, and a third called wave shape or timbre; a first modulating means for varying a first one of said characteristics; a second modulating means for varying a second one of said characteristics; and a third modulating means for varying the same second one of said characteristics; all three modulating means having a modulation frequency within the range of frequency called "vibrato"; a first transducer means connected to receive signal modulated by said first and second modulating means; and a second transducer means connected to receive signal modulated by said first and third modulating means; at least one of said modulating means being out of phase with at least one other modulating means, with respect to the modulation cycle.

2. Equipment according to claim 1 in which said first modulating means is constructed and arranged to modulate frequency; and said second and third modulating means are constructed and arranged to modulate amplitude.

3. Equipment according to claim 2 in combination with means for interconnecting said second and third modulating means to maintain between them a predeterminated constant phase difference.

4. Equipment according to claim 2 in combinaiton with means for determining a different preselected frequency for the vibrato cycle of each of said second and third modulating means, whereby the difference in their vibrato frequencies causes the phase difference between them to change continuously.

5. Equipment according to claim 2 in combination with means for determining, for each of said three modulating means, a preselected different vibrato frequency independent of the others, whereby all three modulating means shift their phase difference continuously.

References Cited by the Examiner

UNITED STATES PATENTS

| | | | |
|---|---|---|---|
| 1,933,299 | 10/1933 | Vierling | 84—1 |
| 1,991,522 | 2/1935 | Ranger | 84—1 |
| 2,583,566 | 1/1952 | Hanert | 84—1.25 |
| 2,649,006 | 4/1953 | Heytow | 84—1.25 |
| 2,681,584 | 6/1954 | Williams | 84—1.18 |
| 2,811,069 | 10/1957 | Faulkner | 84—1.25 |
| 2,835,814 | 5/1958 | Dorf | 84—1.25 |
| 2,879,683 | 3/1959 | Martin | 84—1.24 |
| 2,887,000 | 5/1959 | Leslie | 84—1.25 |
| 3,004,459 | 10/1961 | Jones | 84—1.01 |
| 3,004,460 | 10/1961 | Wayne | 84—1.01 |
| 3,007,361 | 11/1961 | Wayne | 84—1.01 |
| 3,020,488 | 2/1962 | De Miranda et al. | 330—144 X |

ARTHUR GAUSS, *Primary Examiner.*

JOHN C. MACNAB, CARL W. ROBINSON, *Examiners.*